United States Patent
Cardozo

(10) Patent No.: US 7,721,772 B2
(45) Date of Patent: May 25, 2010

(54) PROTECTIVE DEVICES FOR AIRCRAFT FUEL FILLER PORTS

(75) Inventor: Leandro Aparecido Cardozo, Sao Jose dos Campos (BR)

(73) Assignee: EMBRAER - Empresa Brasileira de Aeronautica S.A., Sao Jose dos Campos - SP (BR)

( * ) Notice: Subject to any disclaimer, the term of this patent is extended or adjusted under 35 U.S.C. 154(b) by 184 days.

(21) Appl. No.: 11/953,836

(22) Filed: Dec. 10, 2007

(65) Prior Publication Data

US 2009/0145517 A1    Jun. 11, 2009

(51) Int. Cl.
*B65B 1/04*    (2006.01)
*B65B 3/00*    (2006.01)
*B64D 39/00*    (2006.01)

(52) U.S. Cl. ............ 141/286; 141/369; 141/370; 220/86.2; 244/135 A

(58) Field of Classification Search ............... 141/98, 141/285, 286, 348–350, 369–372; 220/86.2; 244/135 R, 135 A
See application file for complete search history.

(56) References Cited

U.S. PATENT DOCUMENTS

| | | | |
|---|---|---|---|
| 1,643,237 A * | 9/1927 | Cambridge | 220/86.3 |
| 1,882,154 A * | 10/1932 | Mann et al. | 141/286 |
| 1,928,569 A * | 9/1933 | Moreland | 220/86.3 |
| D183,084 S | 6/1958 | Carlson | |
| D323,023 S | 1/1992 | Lazenby | |
| D350,999 S | 9/1994 | Chen | |
| D355,958 S | 2/1995 | Teskey | |
| 5,503,199 A * | 4/1996 | Whitley et al. | 141/312 |
| 5,538,055 A * | 7/1996 | Kunz et al. | 141/312 |
| 5,860,460 A * | 1/1999 | Hidano et al. | 141/286 |
| D460,011 S | 7/2002 | Rashed | |
| 6,880,593 B1 * | 4/2005 | Swane | 141/286 |

* cited by examiner

*Primary Examiner*—Timothy L Maust
(74) *Attorney, Agent, or Firm*—Nixon & Vanderhye P.C.

(57) ABSTRACT

Protective devices are provided subjacent to the filler port within an aircraft's wing fuel tank so as to protect the lower wing skin from being struck by a nozzle associated with refueling equipment. When inserted into the filler port, the nozzle is brought into contact with the protective device which serves to deflect the nozzle in laterally (e.g., in an inboard direction) to thereby prevent the nozzle from striking the lower wing skin. Thus, when initially inserted into the filler port in a generally perpendicular orientation relative to a horizontal plane, the terminal end of the nozzle will contact with the arcuately concave inner surface of the device such that continued insertion of the nozzle into the filler port will cause the nozzle to assume an angularly canted condition in an inboard direction (i.e., a direction toward the aircraft's fuselage).

7 Claims, 5 Drawing Sheets

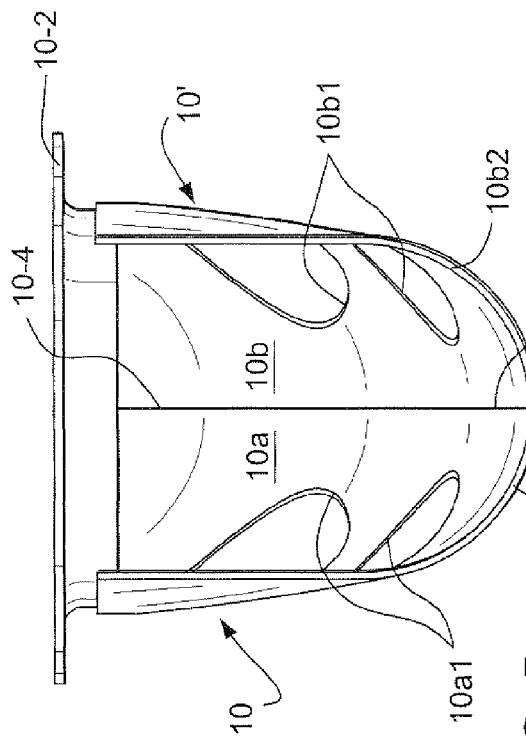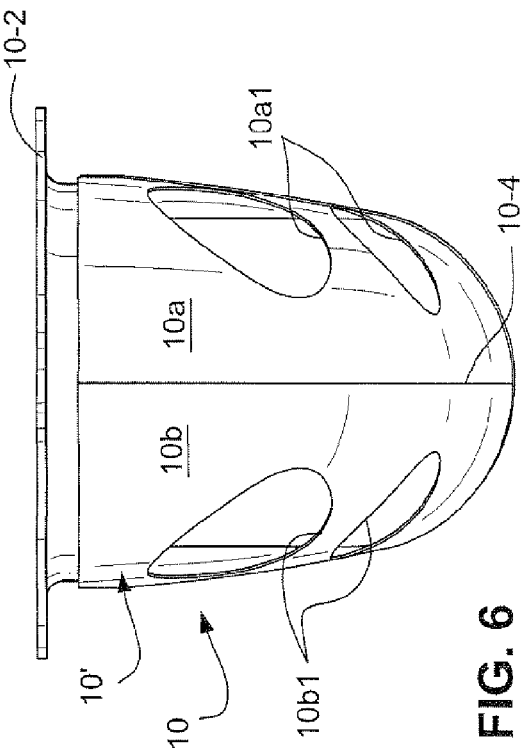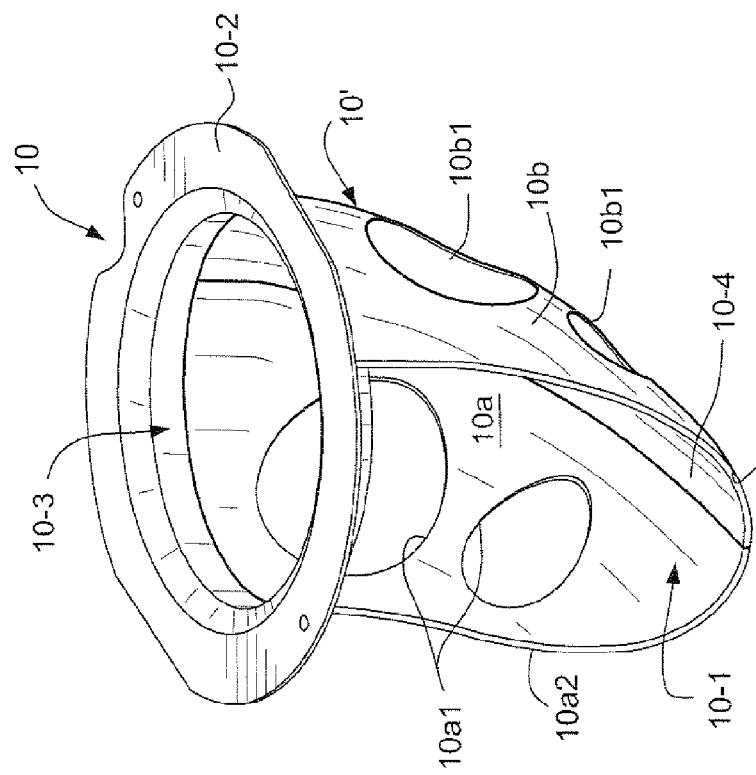

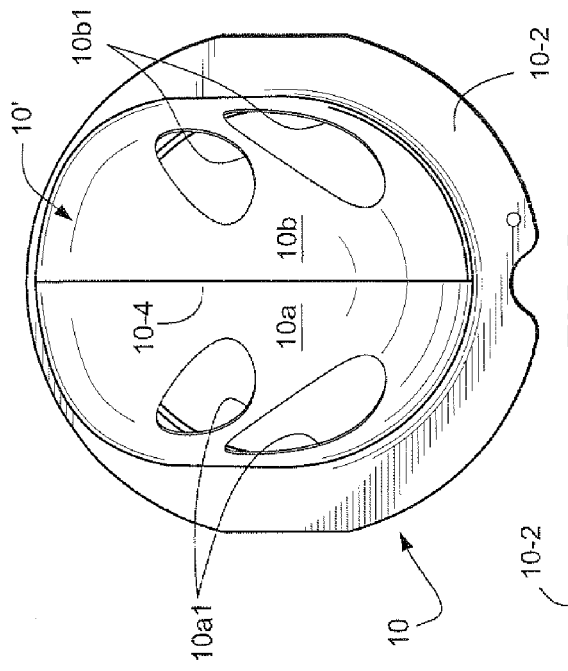
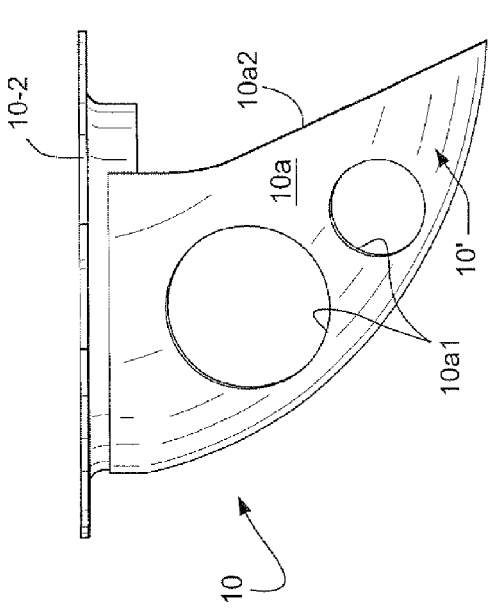
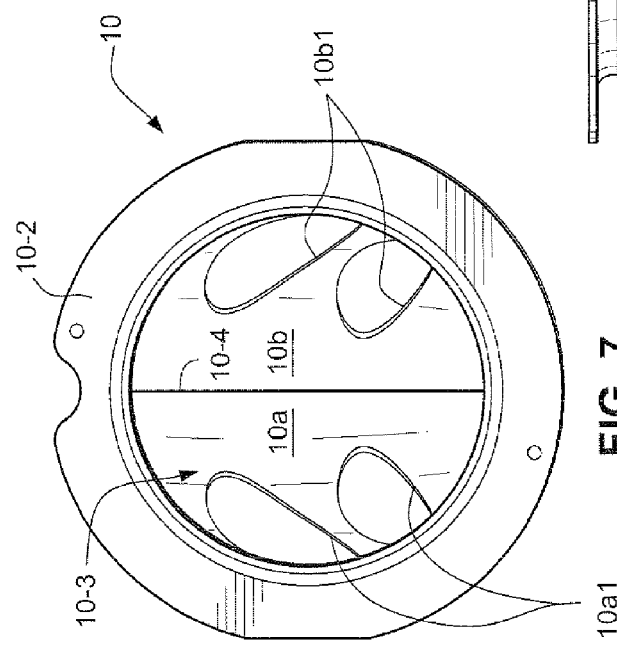
FIG. 7
FIG. 8
FIG. 9

PROTECTIVE DEVICES FOR AIRCRAFT FUEL FILLER PORTS

CROSS-REFERENCE TO RELATED APPLICATION

This application is related to commonly owned U.S. Design application Ser. No. 29/298,678 filed on Dec. 10, 2007 (now U.S. Pat. No. D580,342) entitled Design For: Protective Device for Aircraft Fuel Filler Port, the entire content of which is expressly incorporated hereinto by reference

FIELD OF THE INVENTION

The devices disclosed herein relate generally to aircraft fuel systems. In preferred forms, the disclosed devices serve to minimize (if not prevent entirely) aircraft wing skin damage that may occur during gravity refueling operations of an aircraft's on-board wing fuel tanks.

BACKGROUND AND SUMMARY OF THE INVENTION

Aircraft carry an on-board supply of engine fuel by means of fuel tanks defined by an internal volume of the aircraft's wing structure between the wing's upper and lower structural panels (known in the art as "skins"). Sometimes the wing tanks may include a fuel bladder located within the wing structure between the upper and lower wing skins so as to contain a desired quantity of fuel. In either the wet wing tank design or a bladder wing tank design, the wing tanks may be replenished with fuel by ground based refueling equipment (e.g., fuel tanker vehicles) through capped filler ports. In gravity fill systems, these capped filler ports are located in the upper wing skin and adapted to receive a filler nozzle associated with the refueling equipment.

It can therefore be appreciated that care must be taken to prevent the filler nozzle from being inserted into the filler port to an extent that would cause contact with, and thus potential damage to, the lower wing skin. In order to minimize or prevent such damage, aircraft manufacturers have developed devices located internally within the wing tank that limit the extent to which a filler nozzle may be inserted therein. These conventional devices tend however to be structurally complex (and hence expensive) since they typically include a cylindrical basket-type structure subjacent to the filler port designed to permit fuel to flow therethrough but to provide a structural barrier limiting the extent to which the fuel filler nozzle may be inserted into the wing tank.

It would therefore be desirable if more simplified structures and techniques could be provided which serve to protect an aircraft's gravity filled wing tanks from potential damage from a fuel filler nozzle. It is towards fulfilling such needs that the present invention is directed.

Broadly, the subject matter disclosed herein provides for protective devices for an aircraft fuel filler port associated with an aircraft wing tank that include a wall structure defining a dependent surface which slopes downwardly and laterally relative to the aircraft's longitudinal centerline. As such, a fuel filler nozzle when inserted into the fuel filler port will be angularly oriented laterally (preferably in an aircraft inboard direction). According to some preferred embodiments, the wall structure defines an arcuately concave surface which extends downwardly and laterally relative to the fuel filler port. In such a manner, the nozzle associated with refueling equipment is prevented from striking a lower wing skin of the aircraft wing when inserted into the fuel filler port. The protective device may include an upper annular collar for attachment to an upper wing skin of the aircraft wing so that the device is dependently fixed in coaxial alignment with the fuel filler port. The wall structure may include apertures for the purpose of weight reduction.

According to some embodiments, the wall structure of the device is comprised of a mirror image pair of wall members each defining an arcuate concave surface, the wall members being joined to one another along an edge corresponding to a central vertical plane of the device. The wall structure preferably defines a generally U-shaped forward edge.

An aircraft fuel filler port may include a cap ring defining a fuel filler port opening, a cap for closing the fuel filler port opening, and a protective device for dependent attachment to the cap ring. The protective device preferably has a wall structure extending downwardly into an aircraft's fuel tank and defining a surface, preferably an arcuately concave surface, which slopes downwardly and laterally relative to the filler port opening. As such, the sloped surface prevents the fuel filler nozzle from striking and potentially damaging a lower wing skin of an aircraft's wing when inserted into the fuel filler port. An aircraft may therefore be provided with a wing fuel tank which comprises such a fuel filler port.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein;

FIG. 4 is perspective view of a device for physically diverting a fuel filler nozzle to thereby protect the lower wing skin;

FIGS. 5 and 6 are front and rear elevational views, respectively, of the device depicted in FIG. 4;

FIGS. 7 and 8 are top and bottom plan views, respectively, of the device depicted in FIG. 4; and FIG. 9 is a right side elevational view of the device depicted in FIG. 4, the lest side elevational view being a mirror image thereof.

DETAILED DESCRIPTION OF THE INVENTION

Figure 1:
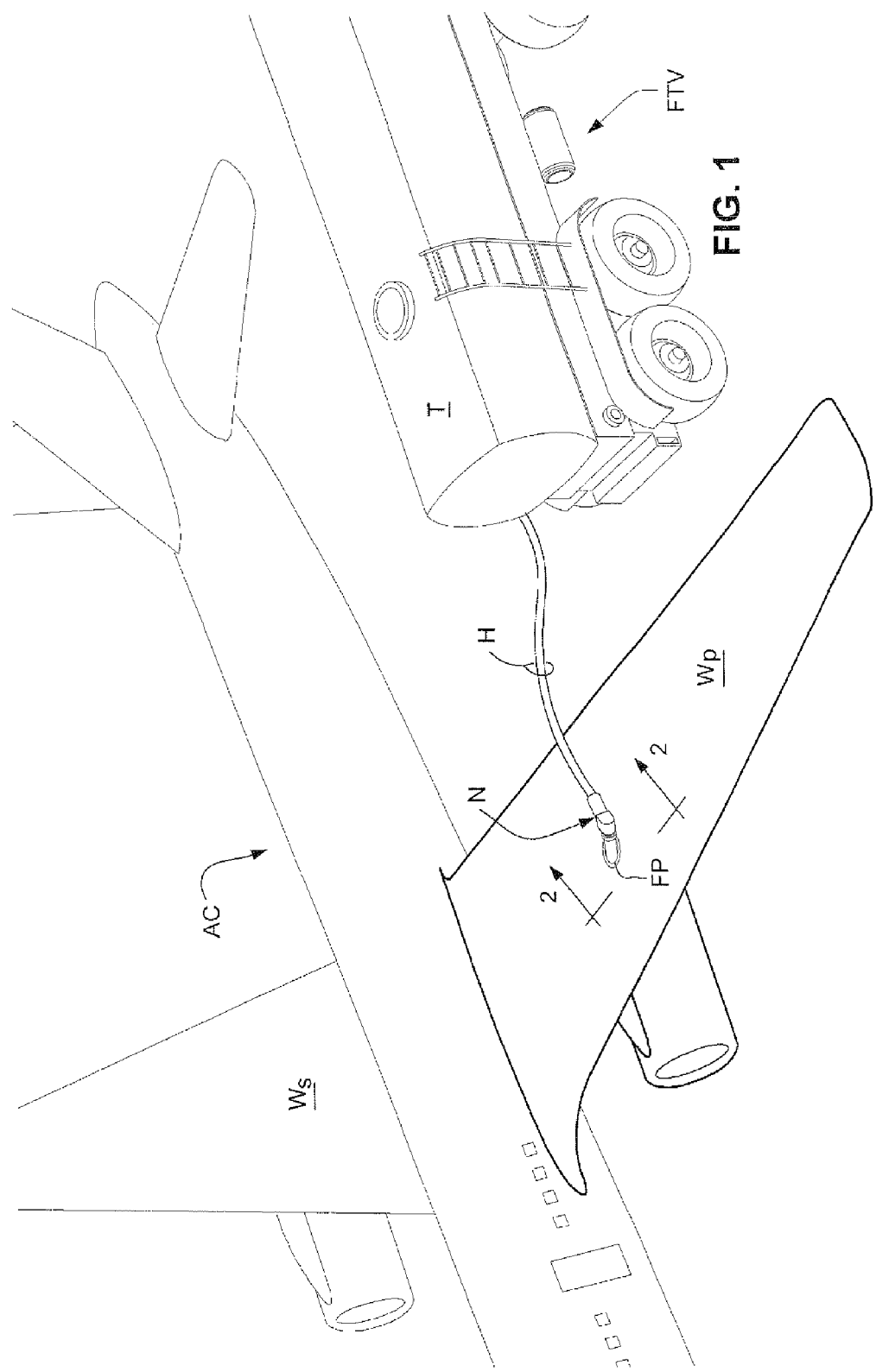
FIG. 1 is a perspective view of an aircraft during a gravity refueling operation.

As described briefly above, aircraft are serviced during a refueling operation so as to replenish the fuel quantity within the aircraft's wing fuel tanks. A typical refueling operation for an aircraft AC having gravity filled wing fuel tanks is depicted in accompanying FIG. 1. As shown, the aircraft AC may be refueled by suitable refueling equipment which in the scene depicted in FIG. 1 is a fuel tanker vehicle FTV. The aircraft AC is provided with internal wing fuel tanks FT (see FIG. 2) within each of its port and starboard wings Wp and Ws which are accessed by a filler port FP. In this regard, only the filler port FP associated with the aircraft's port wing Wp is depicted in FIG. 1 for ease of discussion. However, it will be appreciated that a similar filler port is provided at a mirror image location on the starboard wing Ws. Also, depending on the aircraft's fuel system, a plurality of wing fuel tanks, and hence filler ports, may be provided. The devices discussed herein are applicable to all such gravity-filled fuel tank systems.

The fuel tanker vehicle FTV includes a fuel hose FH which fluid-connects the tank T with an operator-actuated nozzle N. The fuel tanker vehicle FTV will also typically contain a pump (not shown) so as to provide pressurized flow assist to the fuel contained within the tank. The fuel within the tank T will thus flow through the fuel hose FH and be discharged from the nozzle N into the fuel filler port FP of the aircraft's wing tank.

Figure 2:
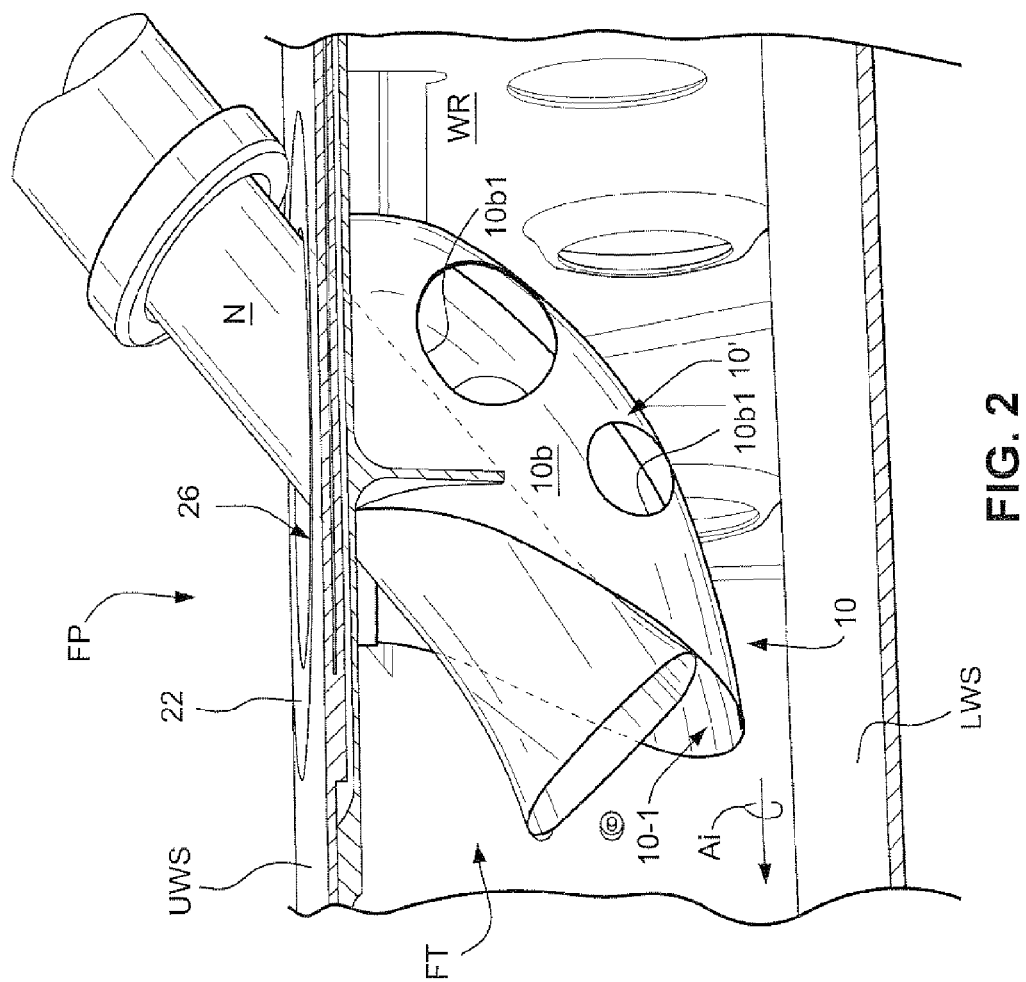
FIG. 2 is an enlarged perspective view of the aircraft's wing fuel filler port during a refueling operation as taken along line 2-2 in FIG. 1.

Accompanying FIG. 2 depicts in greater detail the nozzle N inserted into the fuel filler port FP during a refueling operation. In the scene depicted in FIG. 2, the aircraft's fuel tank FT is defined between upper and lower wing skins UWS and LWS, respectively. Structural integrity of the wing is provided by wing ribs WR which maintain the separation of the wing skins UWS and LWS. Thus, the fuel filler port FP provides access to the fuel tank FT through the upper wing skin UWS as discussed briefly above. In this regard, it will be appreciated that, if left unprotected, careless insertion of the nozzle into the fuel tank FT through the filler port FP could cause the end of the nozzle to strike and potentially damage the lower wing skin LWS.

According to the present invention, a protective device 10 is provided subjacent to the filler port FP within the fuel tank FT so as to protect the lower wing skin LWS from such potential damage. In this regard, as shown in FIG. 2, when inserted into the filler port FP, the nozzle N is brought into contact with the protective device 10 which serves to deflect the nozzle N in an inboard direction (arrow Ai) and prevent the nozzle N from striking the lower wing skin LWS. Thus, when initially inserted into the filler port FP in a generally perpendicular orientation relative to a horizontal plane, the terminal end of the nozzle N will contact with the arcuately concave inner surface 10-1 of the device 10. Since the concave surface slopes downwardly and laterally in an inboard direction, continued insertion of the nozzle N into the filler port FP will cause the nozzle to assume an angularly canted condition in an inboard direction (i.e., a direction toward the aircraft's fuselage). Thus, even if the full length of the nozzle N is inserted into the filler port FP, the angularly canted orientation of the nozzle N in an inboard direction caused by the protective device 10 will prevent the nozzle's terminal end from striking and thereby potentially damaging the lower wing skin LWS.

Figure 3:
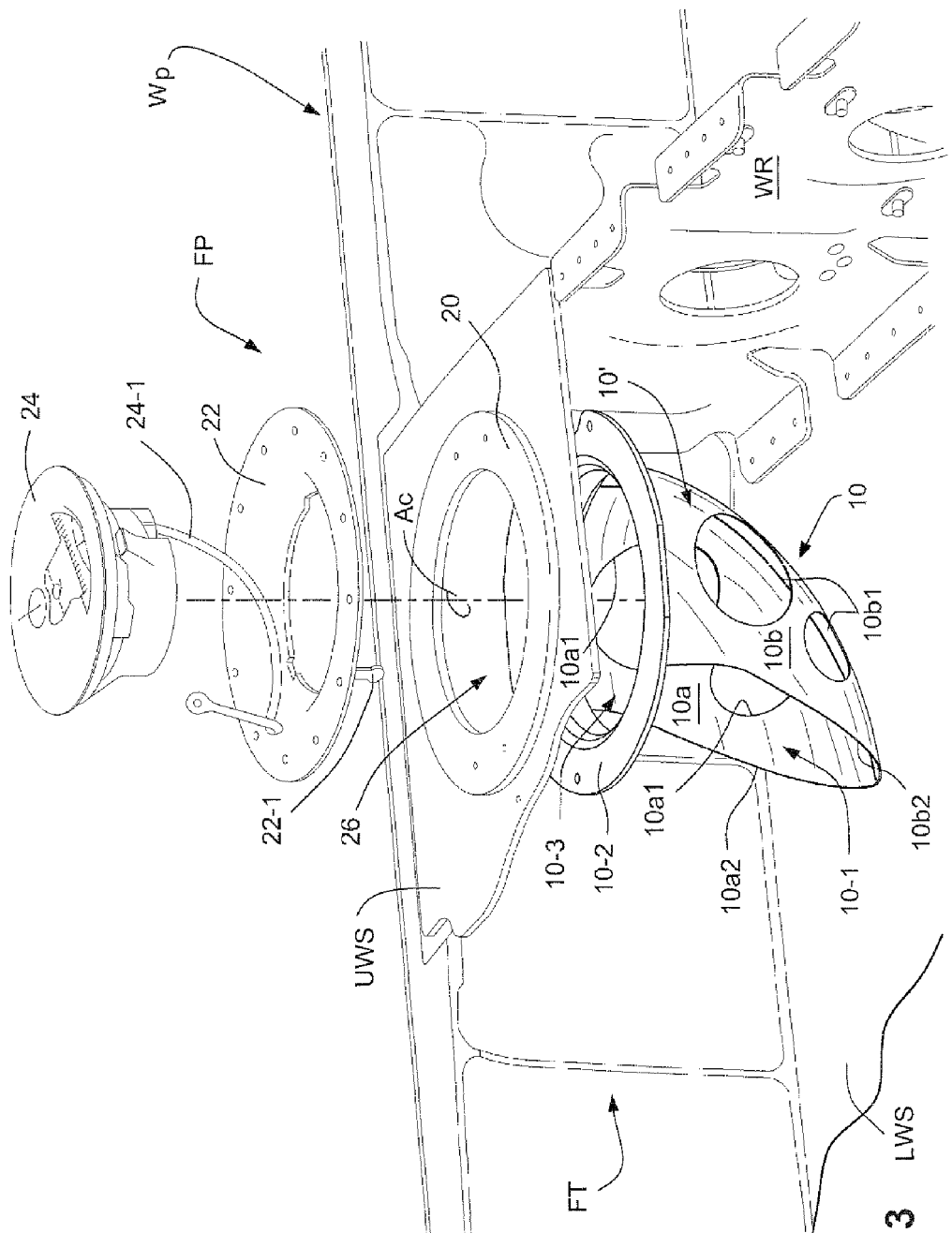
FIG. 3 is an exploded perspective view showing the structural components of an aircraft fuel filler port.

Accompanying FIG. 3 shows an exploded perspective view of the filler port FP mounted within a fuel tank FT associated with the aircraft's port wing Wp. In this regard, the device 10 includes an annular collar 10-2 at its upper end which defines a circular opening 10-3 aligned coaxially with the filler port's central axis Ac. The upper wing skin UWS includes a reinforced ring structure 20 to provide structural support to the collar 10-2 and a cap ring 22 associated with the cap member 24.

The cap member serves to close the filler port FP when refueling is complete. Preferably, the cap member 24 includes a tether 24-1 which is attached to the post 22-1 of the cap ring 22 so as to maintain the cap 24 in the vicinity of the filler port FP when uncapped from the ring 22.

The ring structure 20 defines the filler port's opening 26 which is aligned coaxially with the collar 10-2 of the protective device 10 relative to the central axis Ac. The ring structure 20, cap ring 22 and collar 10-2 are rigidly fixed to one another by any suitable means, e.g., rivets. As such, the protective device 10 is supported dependently by means of the upper wing skin within the fuel tank FT.

As is perhaps best shown in FIGS. 4-9, the protective device 10 includes a body structure 10' that may be formed from a mirror-image pair of concavely arcuate walls 10a, 10b which are joined to one another (e.g., by welding, soldering or like metal-joining techniques) along mated interior edges to establish a central seam 10-4 coincident with a central vertical plane of the device 10. Each of the walls 10a, 10b include openings 10a1, 10b1, respectively, so as to reduce the weight of the device 10 without sacrificing its structural integrity. The walls 10a, 10b define forward edges 10a2, 10b2 providing a generally U-shaped access to the inner concave surface 10-1 of the device 10. It will be observed also (e.g., see FIG. 9) that the lowermost extent of the device 10 protrudes laterally beyond a vertical plane tangent to the central opening 10-3 so that the lower wing skin LWS is visibly blocked by the concave surface 10-1 (see FIGS. 7 and 8). As such, the nozzle N will be prevented from striking the lower wing skin LWS when inserted through the opening 10-3 but instead will be deflected by the concave surface 10-1 and angularly inclined preferably in an inboard direction as described in greater detail previously.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A protective device for an aircraft fuel filler port associated with an aircraft wing fuel tank comprising:
   an annular collar which defines a central opening for the device for coaxial placement relative to a fuel filler port formed in an upper wing skin of an aircraft wing;
   a wall structure connected to the annular collar so the wall structure is dependently fixed in coaxial alignment with the central opening thereof and with the fuel filler port, wherein
   the wall structure defines a U-shaped forward edge extending between uppermost and lowermost extents thereof, and an arcuately concave surface rearwardly of the forward edge, and wherein
   the wall structure slopes downwardly and laterally relative to the fuel filler port such that the lowermost extent thereof protrudes laterally beyond a vertical plane tangent to the central opening to visibly block a lower wing skin of the aircraft wing and thereby prevent a nozzle associated with refueling equipment from striking the lower wing skin of the aircraft wing when inserted into the fuel filler port.

2. The protective device as in claim 1, wherein the wall structure includes apertures.

3. The protective device as in claim 1, wherein the wall structure is comprised of a mirror image pair of wall members each defining an arcuate concave surface, the wall members being joined to one another along an edge corresponding to a central vertical plane of the device.

4. An aircraft fuel filler port comprising:
   a cap ring defining a fuel filler port opening;
   a cap for closing the fuel filler port opening; and
   a protective device for dependent attachment to the cap ring, the protective device comprising:
   an annular collar attached to the cap ring;

a wall structure connected to the annular collar so the wall structure is dependently fixed in coaxial alignment with the fuel filler port opening and extends downwardly into an aircraft's fuel tank, wherein the wall structure defines a U-shaped forward edge extending between uppermost and lowermost extents thereof, and an arcuately concave surface rearwardly of the forward edge, and wherein the wall structure slopes downwardly and laterally relative to the fuel filler port opening such that the lowermost extent thereof protrudes laterally beyond a vertical plane tangent to the central opening to visibly block a lower wing skin of the aircraft wing and thereby prevent a fuel filler nozzle from striking the lower wing skin of an aircraft's wing when inserted into the fuel filler port.

5. The fuel filler port as in claim 4, wherein the wall structure includes apertures.

6. The fuel filler port as in claim 4, wherein the wall structure is comprised of a mirror image pair of wall members each defining an arcuate concave surface, the wall members being joined to one another along an edge corresponding to a central vertical plane of the device.

7. An aircraft having a wing fuel tank which comprises a fuel filler port as in claim 4, 5 or 6.

* * * * *